United States Patent [19]
Inferrera

[11] Patent Number: 5,265,477
[45] Date of Patent: Nov. 30, 1993

[54] DETECTION DEVICE FOR DETECTING THE FLOW AND DIRECTION OF GROUND WATER

[76] Inventor: Jeffrey J. Inferrera, 1794 Kings Rd., Vineland, N.J. 08360

[21] Appl. No.: 718,028

[22] Filed: Jun. 20, 1991

[51] Int. Cl.⁵ .............................................. G01V 9/02
[52] U.S. Cl. ................................ 73/861.09; 73/861.05
[58] Field of Search ........... 73/861.05, 861.06, 861.07, 73/189, 861.09, 170.04, 155

[56] References Cited

U.S. PATENT DOCUMENTS

| | | | |
|---|---|---|---|
| 1,611,502 | 12/1926 | Allen | 73/861.05 |
| 3,820,392 | 6/1974 | Beck et al. | 73/861.06 |
| 4,152,935 | 5/1979 | Negaishi et al. | 73/861.05 |
| 4,331,037 | 5/1982 | DuVall | 73/189 |
| 4,391,137 | 7/1983 | Kerfoot et al. | 73/204.22 |
| 4,393,719 | 7/1983 | Wiegand et al. | 73/861.05 |
| 4,394,825 | 7/1983 | DuVall | 73/861.09 |
| 4,680,962 | 7/1987 | Durbin | 73/189 |
| 4,963,019 | 10/1990 | Foster et al. | 73/861.06 |

FOREIGN PATENT DOCUMENTS 59-26088  2/1984  Japan ................................... 73/861

Primary Examiner—Richard E. Chilcot, Jr.
Assistant Examiner—R. Biegel
Attorney, Agent, or Firm—Louis Weinstein

[57] ABSTRACT

Flow characteristics of a fluid are determined by introducing an electrolytic pulse at a highly localized point within the fluid without disturbing the flow field of the fluid or the form of the pulse and subsequently mapping voltage or conductivity around such point to determine the velocity and direction of fluid flow.

6 Claims, 3 Drawing Sheets 5,265,477

DETECTION DEVICE FOR DETECTING THE FLOW AND DIRECTION OF GROUND WATER

BACKGROUND—TECHNICAL FIELD OF INVENTION

This invention relates to well logging methods and apparatus, specifically well logging methods and apparatus which measure the velocity and direction of a fluid flowing into a single non-pumping borehole environment.

BACKGROUND—DISCUSSION OF PRIOR ART

Heretofore, many methods and apparatus have been developed to provide information about the velocity or direction of a fluid flowing in a borehole environment. These methods include the use of electrolytic tracers, radioisotope tracers, and heat tracers.

Electrolytic tracers have been used in boreholes to determine vertical flow rates during pumping. However, these tracers were useless at low flow velocities since they exhibited density currents. Electrolytic tracers have not heretofore been used in low flow conditions because of the seemingly insurmountable problem of density currents.

The use of radioisotope tracers to determine flow velocity and direction was described by Drost, et. al. in their paper "Point Dilution Methods of Investigating Ground Water Flow by Means of Radioisotopes" (Water Resources Research, 1968). However, their method required one apparatus to determine flow velocity and a separate apparatus to determine flow direction. Also, public fear and governmental regulations makes this method generally useless.

Heat tracer apparatus such as thermistors and hot wire anemometers have been reported by Patten and Bennet in their paper "Methods of Flow Measurements in Well Bores" (USGS Water Supply Paper 1544-C, 1962). However, all such apparatus encountered problems with thermal currents at low flow velocities. Such apparatus was developed for high flow velocities and are useless for a non-pumping borehole environment.

All methods and apparatus heretofore known suffer from at least one of the following disadvantages:

(a) Their use requires a plurality of boreholes. Construction of more than one borehole is an added expense. And/or;

(b) Their use requires one apparatus to determine flow direction and a second separate apparatus to determine flow velocity. Using more than one probe translates into more setup time, more expense, and more operational time. And/or;

(c) Their use can only determine flow direction. Obviously, these methods do not determine flow velocity. And/or;

(d) Their use can only determine flow velocity. Obviously, these methods do not determine flow direction. And/or;

(e) Their use of radioisotope tracers requires regulatory permitting and public approval. And/or;

(f) Their use requires high flow rates to avoid thermal or density currents. These methods are useless in non-pumping borehole environments where flow rate are very low.

To my knowledge, no method or apparatus has been developed which can directly measure both flow velocity and direction of a groundwater flow regime in a single non-pumping borehole environment using a discrete electrolytic pulse.

OBJECTS AND ADVANTAGES

Accordingly, several objects and advantages of my invention, as described in my Master of Science Thesis "Feasibility of a Single Borehole Probe to Measure Groundwater Velocity and Direction" (Cornell University, 1991), are:

(a) to provide a method and apparatus which requires only one borehole to determine groundwater velocity and direction;

(b) to provide a single apparatus which can determine both flow velocity and flow direction;

(c) to provide a tracer that is economical and safe;

(d) to provide a method and apparatus which can determine flow velocity and flow direction at the low flow rates encountered in an non-pumping borehole environment;

(e) to provide a tracer that shows an insignificant amount of density currents in a non-pumping borehole environment.

Further objects and advantages of my invention will become apparent from a consideration of the ensuing drawings and description.

Although the preferred embodiment of this invention will measure the velocity and direction of groundwater flow in a non-pumping single borehole environment, the basic principles of this invention are applicable to a wide range of problems in which the velocity and direction of fluid flow is in question.

BRIEF SUMMARY OF INVENTION

This invention relates to the discovery that an electrolytic pulse having specific physical characteristics released in a very slowly flowing groundwater system can be used to provide measurement of the velocity and direction of such groundwater flow. More specifically, it was found that if sensor measurements are made at different regions around the release area of the electrolytic pulse not only can the flow azimuth be determined, but also the velocity of flow can be determined.

In a basic arrangement, an electrolytic pulse is released at the center of a surrounding array of sensors which measure voltage. By noting the voltage change differential between each individual sensor and a reference sensor, the sensor indicating the greatest such differential provides information concerning the direction of flow whereas the timing which the voltage differential change occurred provides a linear indication of the velocity of flow.

In such a system, the electrolyte is released as a discrete pulse whereafter the voltage differentials between the pairs of sensors are recorded. It was discovered that the use of electrolytes with specific physical properties showed no signs of density currents yet had high voltage differential change relative to background voltage differential fluctuations.

DETAILED DESCRIPTION OF THE INVENTION

Figure 1:
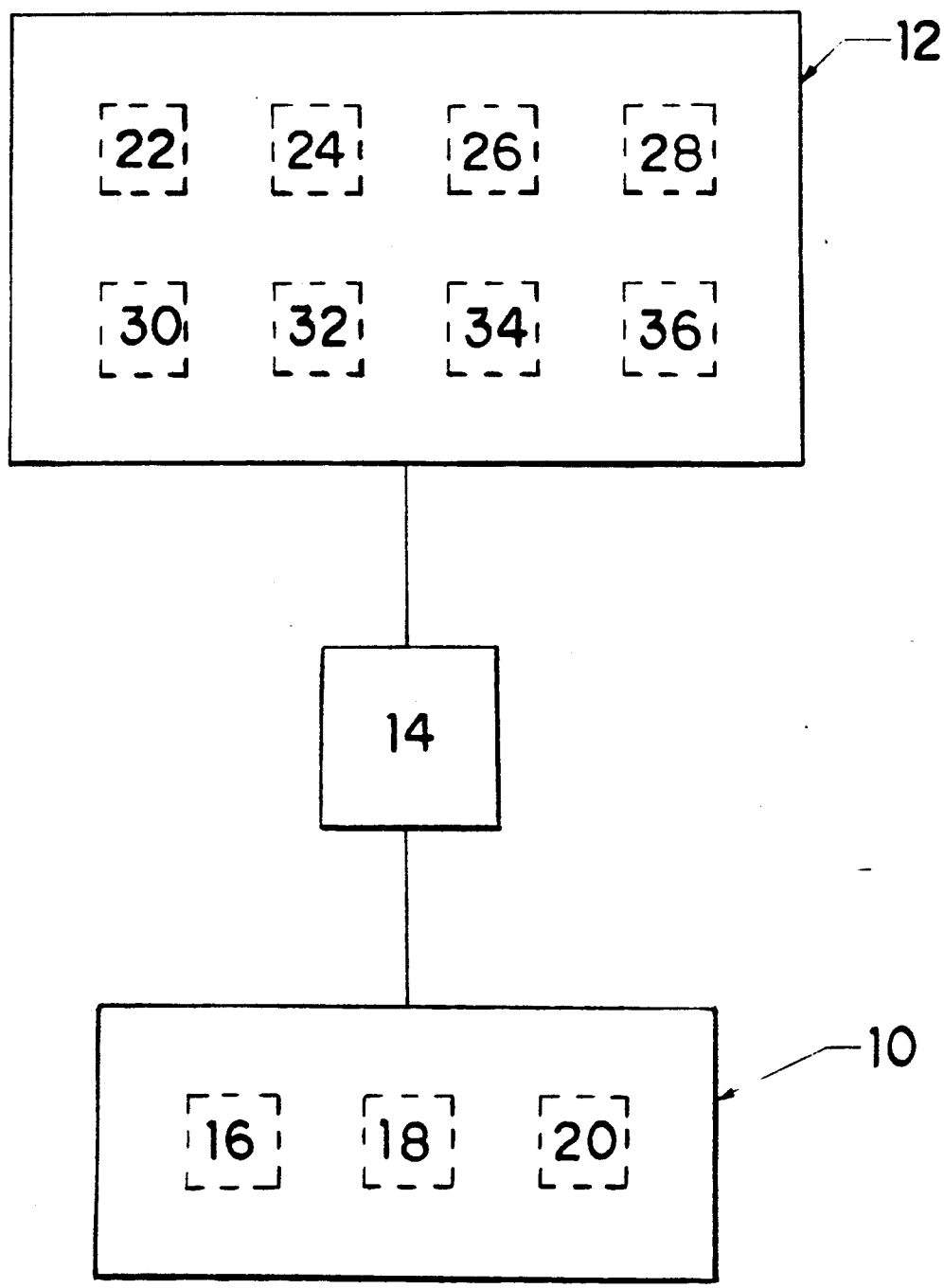
FIG. 1 is a schematic diagram illustrating a practical embodiment of the invention.

FIG. 1 illustrates a practical embodiment of the present invention. A probe means 10 is connected to a microprocessor means 12 by cable means 14.

The microprocessor means 12 is composed of a release switch means 22, a timer means 24, an azimuth determination means 26, a sensor meter means 28, a sensor meter output means 30, a comparison software means 32, a calculation software means 34, and an output means 36.

The probe means 10 supports a release mechanism means 16, sensor means 18, and an electrolytic solution 20.

Figure 2:
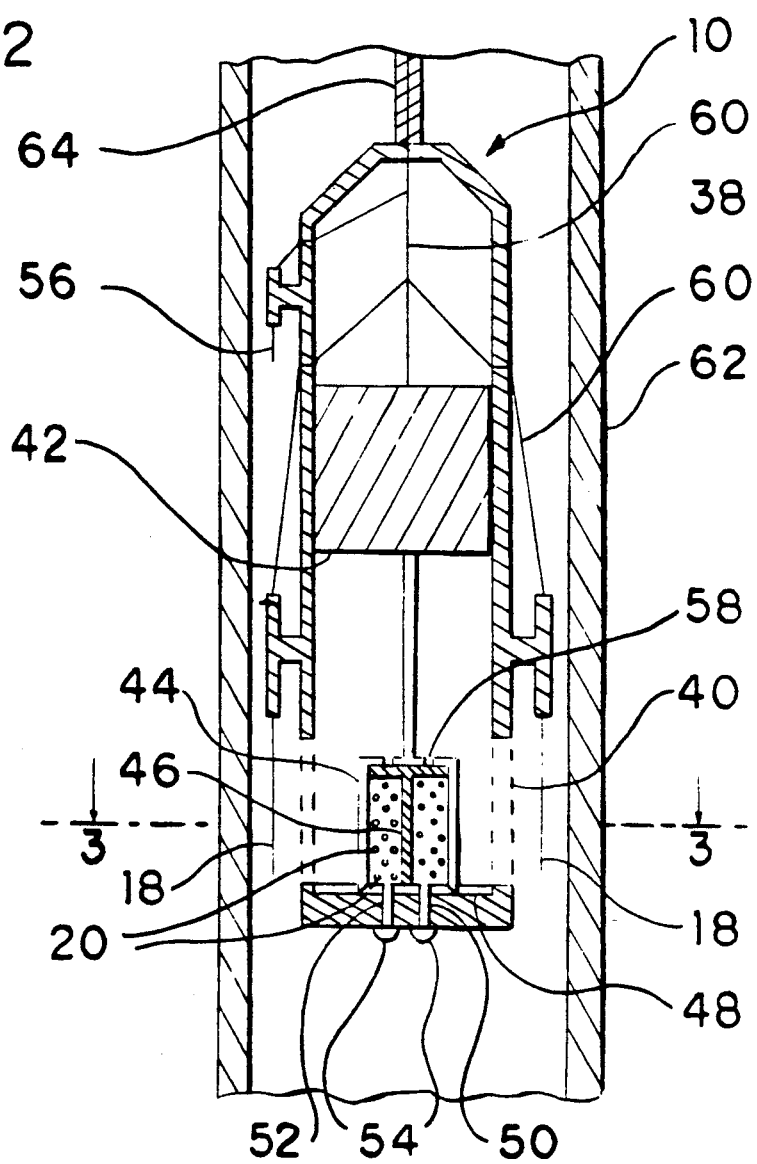
FIG. 2 is a horizontal view illustrating a practical embodiment of the probe.
Figure 3:
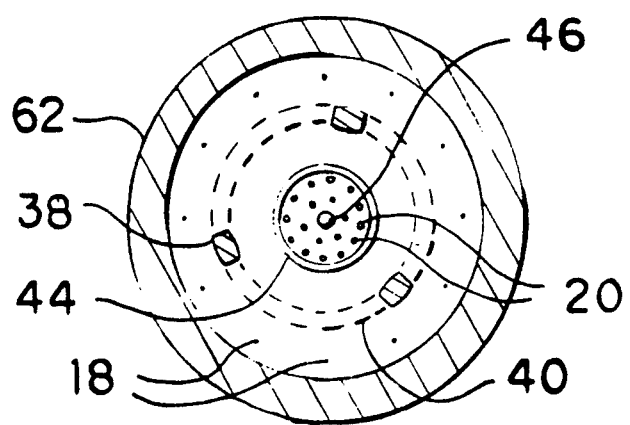
FIG. 3 is a cross sectional view indicated by the Section Lines 3—3 in FIG. 2.

Referring to FIG. 2 and FIG. 3, certain principles of the present invention will be apparent therefrom. As illustrated, a practical embodiment for a probe 10 which can be used, but is not limited to use, in a 5.08 centimeter borehole 62 has a housing 38. The housing 38 has three openings or cutouts 40. A motor means 42 is attached to a chamber 44. The chamber 44 contains an electrolytic solution 20 and electrolytic pulse stabilizing means 46.

The chamber 44 rests on a gasket 48. Through this gasket and the bottom of the housing are an injection hole 50 and an air displacement hole 52. Both holes are sealed by a stopper means 54. The chamber top has anti-vacuum holes 58.

Sensor means 18 are attached to housing 38 and are horizontally displaced from the chamber 44. A reference sensor 56 is mounted on the housing vertically displaced from the chamber. Wires 60 from the motor and all the sensors lead to the surface via the cable means 64. In this particular embodiment of the invention, the sensor means 18 and reference sensor 56 are electrodes.

The electrolytic solution 20 has, in general, the following specific physical characteristics:

(a) a dilute solution. The solution is dilute so there are no density currents upon release into the receiving fluids;

(b) a high sensor response at low concentrations. A high sensor response is necessary to produce a signal above background fluctuations or "noise". The response of an electrode-electrolyte pair is high if their solubility product constant or $K_{sp}$ value is low. A low $K_{sp}$ value for the electrode-electrolyte pair reflects a high reactivity between the electrode-electrolyte pair;

(c) is not a common background ion typically found in the receiving fluid;

(d) the electrolytic solution is composed of at least one electrolyte preferably dissolved in water.

In this particular embodiment of the invention, the electrolytic solution 20 is a one (1) part per million (ppm) sodium sulfide solution. Sodium sulfide is used as the electrolyte because it satisfies the above mentioned criteria, i.e.:

(a) sodium sulfide solution produces no density currents at 1 ppm concentration when released in a receiving fluid of groundwater;

(b) sodium sulfide yields a high sensor response relative to background fluctuations when the electrode is made of silver. Sulfide ions having a high reactivity with silver electrodes, silver sulfide having a $K_{sp}$ of $6 \times 10^{-50}$;

(c) sodium sulfide provides a sulfide ion that is not a common background ion in groundwater;

(d) and sodium sulfide is highly soluble in water.

Again referring to FIG. 1, FIG. 2, and FIG. 3, in this particular embodiment of the invention, the sensor means 18 is a circular array of 12 silver electrodes. These approximately 2.5 centimeter long electrodes are place radially around the chamber. In a 5.08 centimeter borehole these electrodes would be spaced approximately 2.4 centimeters from the center of the chamber. These electrodes are placed so that at least one but not more than two electrodes are intercepted by an electrolytic pulse that is released from the chamber in the center of the probe.

The reference sensor 56 or silver electrode is mounted vertically distant from the array of electrodes and does not come into contact with the electrolytic pulse. The reference electrode is used as reference for voltage comparison with each individual electrode in the electrode array.

The electrodes are connected to a sensor meter means 28 or voltmeter. The voltmeter is used to determine a change in voltage differential between the reference electrode and each individual electrode in the electrode array. The voltage differential change occurring in at least one but not more than two electrodes directly corresponds to the direction of groundwater flow.

The voltage differential change also directly corresponds to the velocity of groundwater flow. This is determined by dividing the distance travelled from the release area of the electrolyte to the electrode by the time the electrolyte intercepts an electrode. All these measurements and calculations are performed by the microprocessor means 12.

The diameter of the chamber 44 is determined by two criteria. Firstly, the chamber diameter is minimized to increase the distance between the sensor means 18 from the electrolytic solution 20 thereby increasing the accuracy of the velocity of flow determination. Conversely, the chamber 44 is of sufficient diameter to release an electrolytic pulse that intercepts at least one but not more than two of the surrounding array of sensor means 18 thereby increasing the accuracy of the direction of flow determination. In this specific embodiment of the invention, the chamber has a diameter of 1.37 centimeters and length of 2 centimeters.

The sodium sulfide solution is injected into the chamber 44 through an injection hole 50. The air in the chamber exits through the air displacement hole 52. The injection hole 50 and air displacement hole 52 are closed by a stopper means 54 which, in the specific construction illustrated, are screws. The stopper means prevents leakage of the solution in the chamber.

After the screws are in place over the injection hole 50 and the air displacement hole 52, the probe is placed in the borehole. Groundwater flows into and out of the probe through the cutouts 40.

The release switch means 22 is an on/off switch that operates the release mechanism means 16. The release mechanism means 16 is a mechanism that establishes a discrete electrolytic pulse into the receiving fluids with minimum disturbance. In this representation, it consists of a motor, chamber, piston, and gasket.

Figure 4:
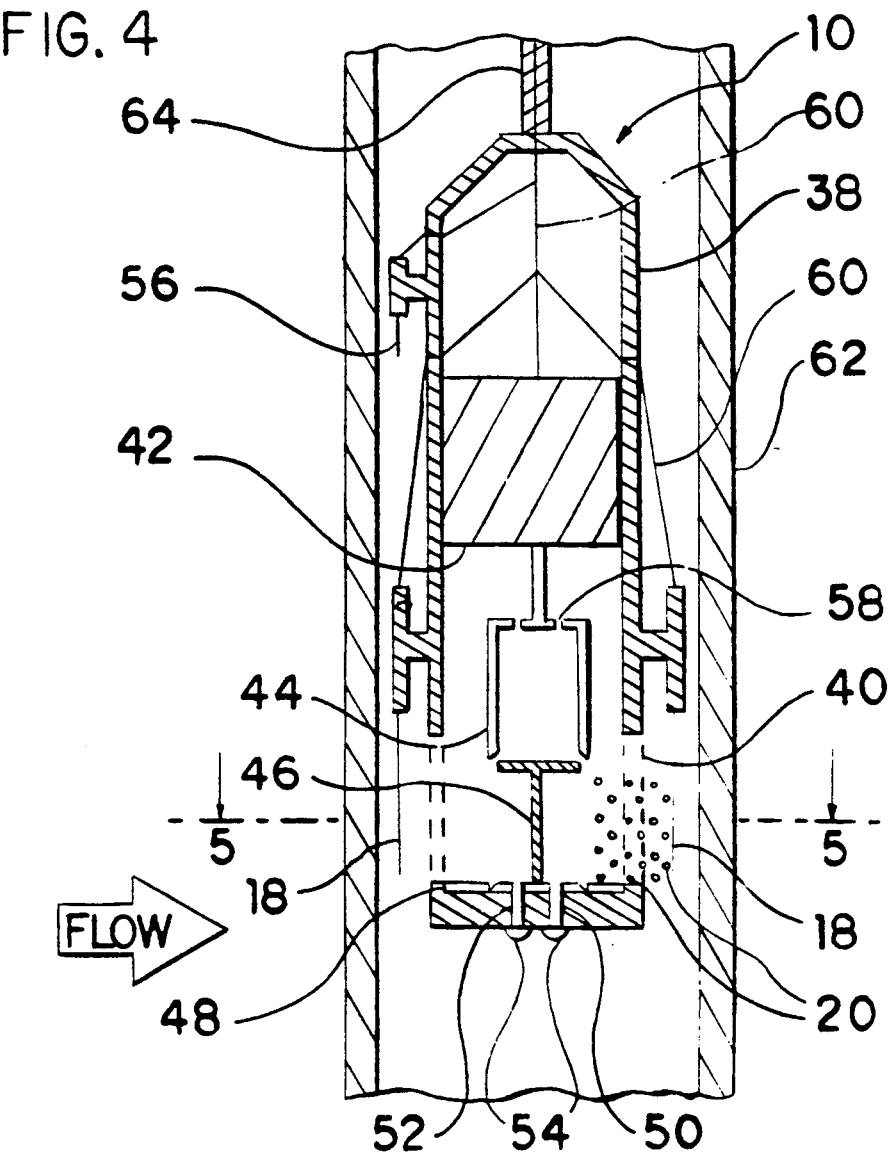
FIGS. 4 and 5 are similar to the sectional views shown respectively as FIGS. 2 and 3, and are presented to show the manner in which the electrolytic solution is released to initiate a detection operation.
Figure 5:
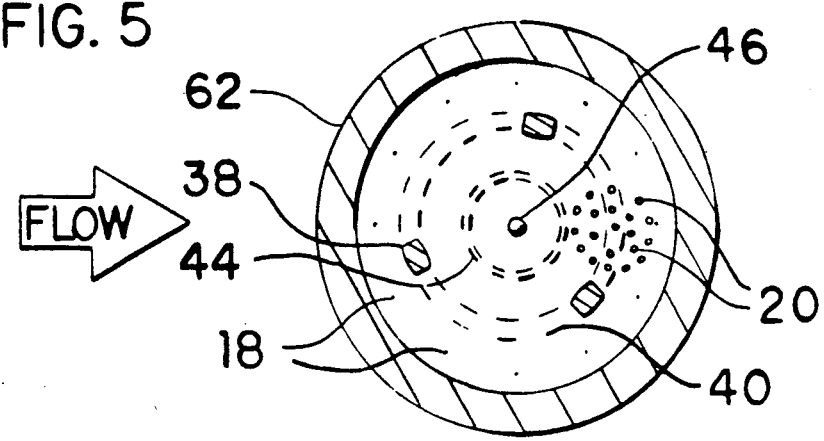

Comparing FIG. 2 and FIG. 3 with FIG. 4 and FIG. 5, inside the chamber 44 is an electrolytic pulse stabilizing means 46 which, in this embodiment of the invention, is a stationary piston. The motor means 42 is actuated by the on/off switch connected to the motor means 42 via the cable means 14. The chamber 44 is slowly lifted by the motor. The sodium sulfide solution travels in the direction and with the velocity of the groundwater flow. The sodium sulfide solution is prevented from rising with the lifted chamber by the piston. Anti-vacuum holes 58 in the top of the chamber 44 allow water to enter between the top of the piston top and the bottom of the chamber top thereby preventing a vacuum condition.

The timer means 24 starts time when the release mechanism means 16 is actuated. The azimuth determination means 26 correlates the position of the probe with the electrode that is intercepted by the electrolytic pulse thereby determining fluid flow direction. The sensor member means 28 is a meter that measures the differential change at all the sensors. The sensor meter means 28 may be but is not limited to a voltmeter or a conductivity meter. The sensor meter output means 30 is a constant graphical output device, e.g. a 12 pen chart recorder, which presents the continuous values of the sensor meter means 28. The comparison software means 32 is a computer program that continuously compares the differential change values coming from the sensor means 18 and determines, by absolute comparisons, the sensor or sensors that are intercepted by the electrolytic pulse and routes the timer means 24 information to the calculator means 34. The calculator means 34 determines the fluid flow velocity from the predetermined travel distance of the electrolytic pulse and the timed travel time of the electrolytic pulse from release to sensor intercept. The output means 36 is a digital and hard copy output of the velocity and direction of fluid flow.

This invention can be used in but is not limited to use in boreholes. Also, this embodiment of the invention uses but is not limited to use of sodium sulfide solution and silver electrodes. Packers can be installed above and below the probe means to prevent vertical currents in the borehole.

SUMMARY, RAMIFICATION, AND SCOPE

Accordingly, the reader will see that the flowmeter of this invention can be used to determine the velocity and direction of groundwater flowing through a non-pumping borehole environment. Furthermore, the invention has the advantage in that
 only one borehole is required;
 both fluid velocity and direction can be determined with the same probe; and
 the tracer is economical and safe.

Although the description above contains many specificities, these should not be construed as limiting the scope of the invention but as merely providing illustrations of some of the presently preferred embodiments of this invention. For example, the electrolytic solution can consist of other electrolytes, the electrodes can be made of other materials; the chamber release mechanism can be of other constructions; the number of electrodes, the spacing of electrodes, and the size of the chamber can be changed, especially in different size boreholes.

Thus the scope of the invention should be determined by the appended claims and their legal equivalents, rather than by the examples given.

What is claimed is:

1. A method for measuring flow velocity and direction of groundwater flowing at a rate of less than 15 feet per day, comprising the steps of:
   (a) providing an electrolytic solution comprised of 1 part per million sodium sulfide in water;
   (b) releasing a controlled amount of said electrolytic solution in a groundwater regime such that the controlled amount is released from an enclosure;
   (c) obtaining electrical measurements at a sensor means comprised of silver electrodes; at at least four locations each a given distance from said enclosure and arranged in a common flow path plane and spaced at angular intervals from the enclosure, and at a reference sensor means comprised of a silver electrode, at a location above the flow path plane of the electrolytic solution released from said enclosure; and
   (d) determining flow velocity and direction of the groundwater from the measurements obtained in step (c).

2. A flowmeter for measuring velocity and direction of flowing groundwater, said flowmeter including:
   a release mechanism means, having a release chamber, said release means arranged to release a solution containing an electrolyte with minimum flow field disturbance, minimum flow field disturbance defined as a flow field disturbance which does not affect the accuracy of the determination of groundwater flow velocity and direction;
   said electrolyte having the following characteristics:
   (a) being soluble in water;
   (b) demonstrating insignificant density currents such that groundwater flow direction and velocity are not measurably changed by said electrolyte when said electrolyte is introduced in groundwater as an electrolytic solution;
   (c) including an ion having a low $K_{sp}$ value with respect to the sensor means;
   (d) said ion not naturally occurring in the receiving fluid such that an electrolyte measurement is not masked by background noise from an ion which is the same type of ions as said electrolyte; and
   (e) creating a high sensor means response due to ions of the electrolyte in comparison to a background sensor means response due to other ions in the groundwater such that a measurement of ions due to the electrolyte is not masked by other ions in the groundwater;
   sensor means, including electrodes arranged at angular intervals so as to surround said release mechanism means and be intercepted by the electrolytic solution which substantially moves in a given flow plane,
   a reference sensor means displaced from said flow plane to provide a base sensor value for determining a differential value; and
   sensor meter means, arranged to continuously measure changes in the sensor differential value for use to determine velocity and direction of groundwater flow.

3. The release mechanism as defined in claim 2 further comprising a release chamber said release chamber comprising:
   (a) an air-tight enclosure of a given size constituting a chamber;
   (b) a filling hole for introducing an electrolytic solution;
   (c) an air escape hole for escape of air in the chamber as the air is displaced by an electrolytic solution such that no air or air bubbles remain in the chamber when said chamber is completely filled with said electrolytic solution; and (d) said release mechanism including means for slowly releasing the electrolytic solution from the chamber without creating eddies in the groundwater that would disturb groundwater flow velocity and direction.

4. A flowmeter for measuring velocity and direction of flowing groundwater, said flowmeter including:

a release mechanism means, having a release chamber, said release means arranged to release a solution containing an electrolyte with minimum flow field disturbance, minimum flow field disturbance defined as a flow field disturbance which does not affect the accuracy of the determination of groundwater flow velocity and direction;

said electrolyte having the following characteristics:

(a) being soluble in water;

(b) demonstrating insignificant density currents such that groundwater flow direction and velocity are not measurably changed by said electrolyte when said electrolyte is introduced in groundwater as an electrolytic solution;

(c) including an ion having a low $K_{sp}$ value with respect to the sensor means;

(d) said ion not naturally occurring in the receiving fluid such that an electrolyte measurement is not masked by background noise from an ion which is the same type of ions as said electrolyte; and (e) creating a high sensor means response due to ions of the electrolyte in comparison to a background sensor means response due to other ions in the groundwater such that a measurement of ions due to the electrolyte is not masked by other ions in the groundwater;

sensor means, including electrodes arranged at angular intervals so as to surround said release mechanism means and be intercepted by the aforesaid electrolytic solution which moves in a given flow plane, a reference sensor means displaced from said flow plane to provide a base sensor value for determining a differential value; and sensor meter means, arranged to continuously determine the sensor differential changes to determine velocity and direction of groundwater flow;

said electrolytic solution being a sodium sulfide solution containing one part per million of sodium sulfide.

5. A flowmeter for measuring velocity and direction of flowing groundwater, said flowmeter including:

a release mechanism means, having a release chamber, said release means arranged to release a solution containing an electrolyte with minimum flow field disturbance, minimum flow field disturbance defined as a flow field disturbance which does not affect the accuracy of the determination of ground water flow velocity and direction;

said electrolyte having the following characteristics:

(a) being soluble in water;

(b) demonstrating insignificant density currents such that groundwater flow direction and velocity are not measurably changed by said electrolyte when said electrolyte is introduced in groundwater as an electrolytic solution;

(c) including an ion having a low $K_{sp}$ value with respect to the sensor means;

(d) said ion not naturally occurring in the receiving fluid such that an electrolyte measurement is not masked by background noise from an ion which is the same type of ions as said electrolyte; and (e) creating a high sensor means response due to ions of the electrolyte in comparison to a background sensor means response due to other ions in the groundwater such that a measurement of ions due to the electrolyte is not masked by other ions in the groundwater;

sensor means, including electrodes arranged to surround said release mechanism means and be intercepted by the electrolytic solution which moves in a given flow plane, a reference sensor means displaced from said flow plane to provide a base sensor value for determining a differential value; and sensor meter means, arranged to continuously determine the sensor differential changes for use to determine velocity and direction of groundwater flow;

said sensor means and reference sensor means being silver electrodes.

6. A flowmeter for measuring velocity and direction of flowing groundwater, said flowmeter including:

a release mechanism means, having a release chamber, said release means arranged to release an electrolytic solution containing an electrolyte with minimum flow field disturbance, minimum flow field disturbance defined as a flow field disturbance which does not affect the accuracy of the determination of groundwater flow velocity and direction;

said electrolyte having the following characteristics:

(a) being soluble in water;

(b) demonstrating insignificant density currents such that groundwater flow direction and velocity are not measurably changed by said electrolyte when said electrolyte is introduced in the groundwater as an electrolytic solution;

(c) including an ion having a low $K_{sp}$ value with respect to the sensor means;

(d) said ion not naturally occurring in the receiving fluid such that an electrolyte measurement is not masked by background noise from an ion which is the same type of ions as said electrolyte; and (e) creating a high sensor means response due to ions of the electrolyte in comparison to a background sensor means response due to other ions in the groundwater such that a measurement of ions due to the electrolyte is not masked by other ions in the groundwater;

sensor means, including electrodes arranged to surround said release mechanism means and be intercepted by the aforesaid electrolytic solution which moves in a given flow plane, a reference sensor means displaced from said flow plane to provide a base sensor value for determining a differential value; and sensor meter means, arranged to continuously determine the sensor differential changes for use to determine velocity and direction of groundwater flow;

said sensor means being a multichannel voltmeter.

* * * * *